(12) United States Patent
Fukuda et al.

(10) Patent No.: US 7,161,760 B2
(45) Date of Patent: *Jan. 9, 2007

(54) REPRODUCING APPARATUS AND REPRODUCING METHOD FOR REPRODUCING DATA BY SCANNING SLANT TRACKS USING A PLURALITY OF REPRODUCING HEADS

(75) Inventors: Shinichi Fukuda, Kanagawa (JP); Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/205,947

(22) Filed: Aug. 17, 2005

(65) Prior Publication Data

US 2006/0039078 A1   Feb. 23, 2006

Related U.S. Application Data

(62) Division of application No. 10/757,278, filed on Jan. 14, 2004.

(30) Foreign Application Priority Data

Jan. 17, 2003  (JP)  ............................. 2003-009383

(51) Int. Cl.
    *G11B 5/584*    (2006.01)

(52) U.S. Cl. .................................................. 360/77.12
(58) Field of Classification Search .................... None
    See application file for complete search history.

(56) References Cited

U.S. PATENT DOCUMENTS 6,731,452 B1 *  5/2004  Kotani et al. ............ 360/77.13

\* cited by examiner

*Primary Examiner*—Hoa T. Nguyen
*Assistant Examiner*—Mitchell Slavitt
(74) *Attorney, Agent, or Firm*—Sonnenschein Nath & Rosenthal LLP

(57) ABSTRACT

First, data is read from tracks formed on a tape-shaped recording medium by heads disposed on a rotary drum, to measure error rates. Next, of the tracks formed on the tape-shaped recording medium, a worst track suffering the highest error rate is detected based on the error rates thus measured. Then, a pair of reproducing heads that can reproduce the worst track thus detected at the lowest error rates is detected from the measured error rates. Thereafter, tracking servo control is performed such that the worst track can be scanned by the pair of reproducing heads. As a result, a reproducing apparatus capable of proper reproduction even when recorded tracks undergo variations in width and reproducing heads are erroneously mounted.

3 Claims, 16 Drawing Sheets

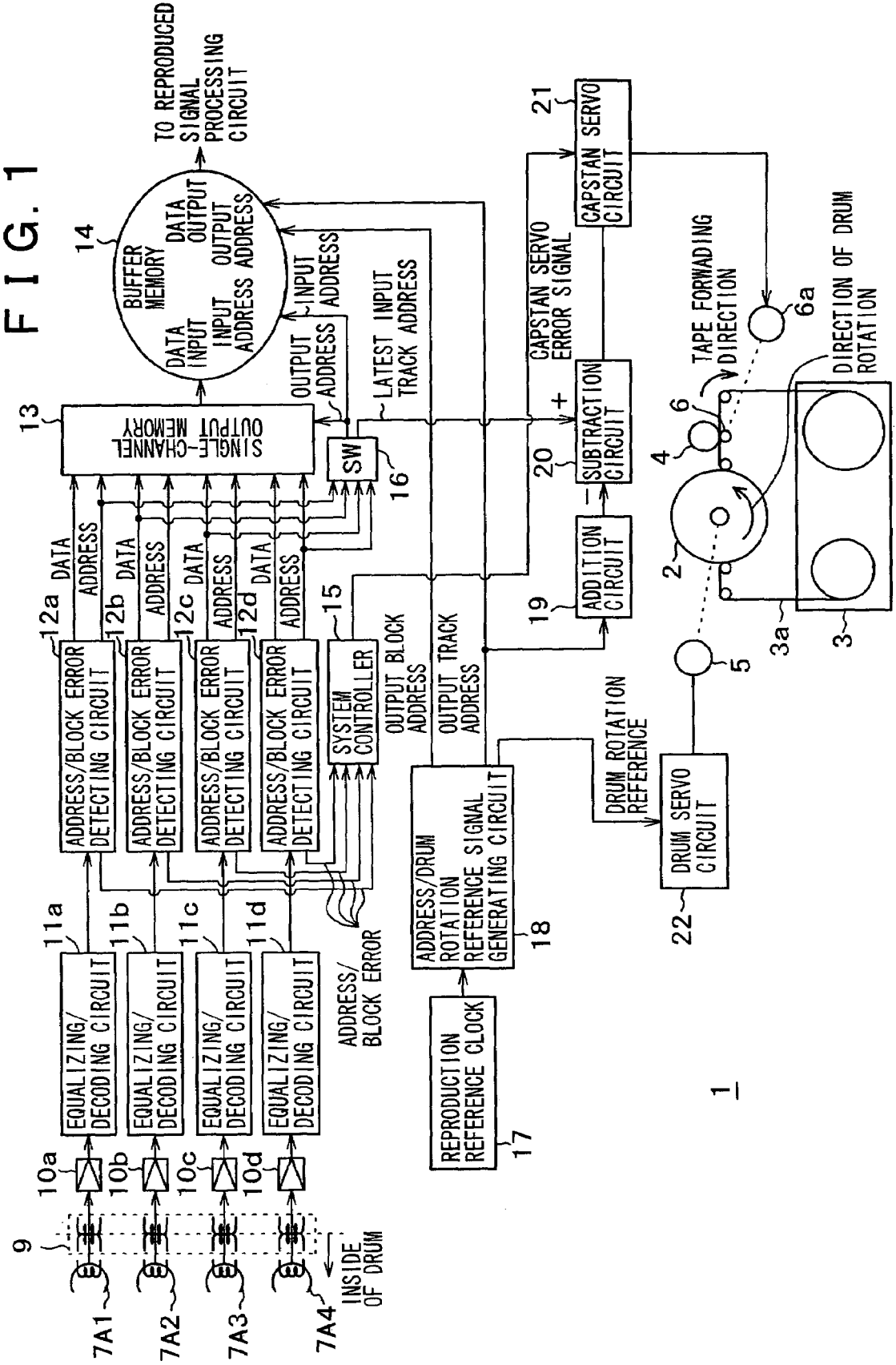

SCANNING DIRECTION

F I G. 1 0
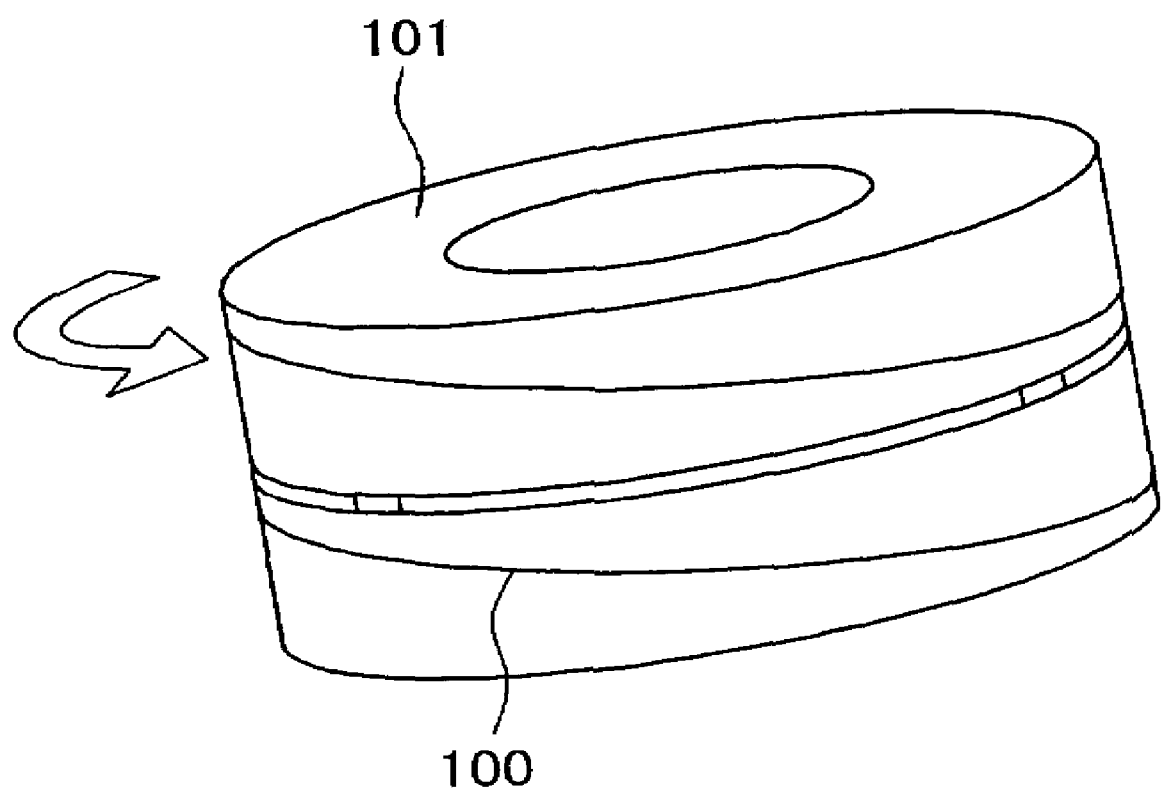

RUNNING TRAJECTORY OF HEAD

WITH ERROR

RECORDING BY ONE RECORDING
HEAD PER AZIMUTH

RECORDING BY TWO RECORDING
HEAD PER AZIMUTH

ONE-HEAD-PER-AZIMUTH RECORDING

TWO-HEAD-PER-AZIMUTH RECORDING

REPRODUCING APPARATUS AND REPRODUCING METHOD FOR REPRODUCING DATA BY SCANNING SLANT TRACKS USING A PLURALITY OF REPRODUCING HEADS

CROSS REFERENCE TO RELATED APPLICATIONS

This is a divisional of co-pending U.S. application Ser. No. 10/757,278, filed on Jan. 14, 2004, which is based on and claims priority to Japanese Application JP2003-009383, filed in the Japanese Patent Office on Jan. 17, 2003, both of which are incorporated herein by reference to the extent permitted by law.

BACKGROUND OF THE INVENTION

1. Field of the Invention

The present invention relates to a reproducing method for reproducing data by scanning slant tracks with a helical scan technique, and a reproducing apparatus reproducing data using such a reproducing method.

2. Description of Related Art

Conventionally, as a data recording/reproduction method using a magnetic tape as a storage medium, a helical scan technique is extensively employed. In the helical scan technique, a magnetic tape 100 is wrapped at a slant angle around a rotary head drum 101 as shown in, for example, FIG. 10. Under this condition, the tape 100 is moved so that the head drum 101 rotates in the direction of the arrow, whereby a head scans at the slant angle with respect to the tape running direction. In this way, tracks are formed on the tape 100 by recording data at slant angles with respect to the tape running direction, or data is reproduced from such tracks, as shown in FIG. 11.

Furthermore, the above-mentioned helical scan technique adopts so-called azimuth recording. In azimuth recording, a pair of heads is used with their gaps slanted at different azimuth angles A and B, respectively, to alternately form on the magnetic tape 100 a track TkA depicting a recording pattern at the azimuth angle A and a track TkB depicting a recording pattern at the azimuth angle B, as shown in FIG. 11.

To reproduce data from a track recorded by such azimuth recording as mentioned above, a reproducing head 102A corresponding to the track TkA is used, and a reproducing head 102B is used for the track TkB recorded at the azimuth angle B as shown in FIG. 12. In this way, signals produced from adjacent tracks can be suppressed from affecting each other as noise owing to the azimuth effect, whereby a higher density recording can be implemented.

As one data reproducing technique in the helical scan technology, a tracking servo system is widely known in the art, in which each of the thus formed tracks is read by single scanning performed by a reproducing head. As shown in, for example, FIG. 13, the tracking servo system controls a reproducing head 102 to keep the head constantly right above a track Tk so that all the data recorded on the track Tk will be read by causing the single head 102 to scan only once.

Thus, in the tracking servo system, error information is gathered, for example, by comparing a block-based scanning time with a pre-defined reference value in each track Tk, and the scanning position of the reproducing head 102 is controlled based on the error information to maintain the so-called "just tracking state" (Japanese Unexamined Patent Application Publication No. H9-245394).

As another reproducing technique in the helical scan technology, a non-tracking (NT) system is known in the art. In the NT system, recorded data is scanned during reproduction at a track twice of that of the recording period. Reproduced signals are obtained twice on the average per track, and the better one is used for the data reproduction.

FIG. 14 conceptually shows the relationship between recorded tracks and reproducing heads in a NT system. Note that a description is given only of reproduction of azimuth tracks A in FIG. 14, and a description of azimuth tracks B will be omitted. Here, the tracking servo system as a reproducing technique would use reproducing heads 103 and 105 to scan tracks TkA-1 and TkA-2 to reproduce data, respectively. By contrast, the NT system, which scans data during reproduction at a track twice of that of during recording period, would cause a reproducing head 104 to intervene for scanning between the scanning operations performed by the reproducing heads 103 and 105.

In an example shown in FIG. 14, the track TkA-1 is scanned by the heads 103 and 104, and both heads provide effective reproduced signals for the track TkA-1. In this case, however, a comparison between the heads 103 and 104 indicates that the head 103 overhangs the track TkA-1 wider and, in addition, is less likely to near the track TkA-2 next to the adjacent track of the track TkA-1. Therefore, the reproducing head 103 will provide a more satisfactory reproduced signal. And only a correctly read portion of the thus reproduced signal is re-arranged to provide stream data. Such an NT system requires neither accurate tracking servo nor accurate scanning angle with respect to tracks, thus making the system free from mechanical tolerances, for example.

SUMMARY OF THE INVENTION

In order to increase data transfer rate during recording in a helical scan type magnetic recording system such as mentioned above, either the recording frequency may be increased or the number of recording and reproducing heads, i.e., recording channels may be increased for parallel data processing.

Higher frequency recording can be achieved by improving the high frequency performance of a device. In case, for example, improvements in device performance fail to keep up with the speed requirements of the magnetic recording system, then a viable solution would be to increase the number of recording channels in order to perform parallel processing.

Additionally, in order to scan data during reproduction twice of that of the recording period in the above-mentioned NT reproducing system, either two reproducing heads may be disposed for single recording head, or one reproducing head may be used to scan the same track twice by making the speed of the rotary head drum 101 during reproduction twice of that of the recording period. Alternatively, using as many recording heads as reproducing heads while keeping the speed of the drum 101 equal during both recording and reproduction, recording may be performed only once for every two revolutions of the drum 101. Many NT systems of the above type tend to increase their transfer rate during recording/reproduction by increasing the number of recording/reproducing heads.

When the number of reproducing heads is increased, if, for example, a single recording head is mounted per track to form each of tracks TkA and TkB respectively having different azimuth angles, then two reproducing heads is required per track, and hence a total of four reproducing heads is required to reproduce data from both tracks TkA and TkB. That is, to reproduce data from, e.g., the track TkA, two reproducing heads A11 and A12 are required as shown in FIG. 15.

In order to further improve the transfer rate during recording/reproduction, for example, two recording heads may be used to alternately record tracks of the same azimuth. That is, each of the tracks TkA and TkB may be formed using two recording heads. In this case, four reproducing heads are required for each of the tracks TkA and TkB, and thus a total of eight reproducing heads is involved to reproduce data from both tracks. And the two reproducing heads A11 and A12 are similarly necessary as shown in FIG. 15, in order to reproduce data from the track TkA formed by one of the two recording heads.

The reproducing heads A11 and A12 are aligned with respect to a track as the drum 101 rotates and the tape runs such that the distance between their scanning positions equals such a standard pitch P0 as shown in FIG. 15. In this case, the heads A11 and A12 are aligned such that the standard pitch P0 exactly equals the track pitch. Furthermore, when the phase among the reproducing heads and the recorded track, i.e., their positional relationship is such as shown in FIG. 15, a worst track occurs, making reproduced signals worst in quality.

In other words, if the phase relationship among the reproducing heads A11 and A12 and the recorded track TkA shown in FIG. 15 changes as one of the heads A11 and A12 moves either to the left or right, respectively, then either A11 or A12 head moves towards the center of the track TkA, and the head closer to the center provides a more satisfactory reproduced signal, to improve the reproduction quality.

However, the reproducing heads A11 and A12, when mounted at such positions, may undergo some error due to, for example, certain mechanical problems, and in addition, may even be displaced in a direction orthogonal to the track. Under such circumstances, as shown in FIG. 16, if the two reproducing heads A11 and A12 are mounted out of alignment in a manner mutually shifted away from the center of the track TkA, i.e., if the distance between their scanning positions changes from the standard pitch P0 to a pitch P1, then the reproducing output levels produced by these two reproducing heads A11, A12 greatly deteriorate.

This misalignment may be experienced likewise by the recording head(s), thus producing on the magnetic tape 100 patterns of narrow recorded tracks or of narrow and wide recorded tracks, as shown in, for example, FIGS. 17 and 18. In one pattern, the same azimuth tracks TkA would be recorded at the same width as shown in FIG. 17, if, for example, single recording head is used per azimuth. That is, in this case, the tracks of the same azimuth are recorded by the same head, thus resulting in the same pattern.

By contrast, if two recording heads are used per azimuth, i.e., if a total of four recording heads are mounted for recording the tracks TkA at the azimuth angle A and the tracks TkB at the azimuth angle B, i.e., even when the tracks are of the same azimuth, if they are recorded alternately by the different recording heads, then a track TkA1 and a track TkA2 respectively having different widths will appear alternately as shown in, for example, FIG. 18.

Referring here to FIGS. 19A, 19B, 20A and 20B, a consideration is given to inconvenience caused by some error in mounting the reproducing heads onto the rotary head drum 101. First, FIGS. 19A and 19B schematically show scanning operations during NT-based reproduction in single-head-per-azimuth recording. For ease of explanation, only reproduction of the track TkA recorded at the azimuth angle A will be discussed.

When the track TkA is formed at a width smaller than a normal width, and if the two reproducing heads A 11 and A 12 for reproducing data from this track are positioned at the standard pitch P0, then the track TkA falls within their scanning range as shown in FIG. 19A, thus providing an adequate reproduced signal.

However, when, for example, the reproducing heads A11 and A12 suffer some mounting errors to have a wider pitch as shown in FIG. 19B, the track TkA may get out of the scanning range of either of the heads A11 and A12. That is, in this case, it is difficult to obtain an adequate reproduction output, and thus the quality of the reproduced data will be largely impaired.

Furthermore, FIGS. 20A and 20B show scanning operations during NT-based reproduction when two recording heads are disposed per azimuth. In this case, if, for example, the two recording heads for recording the track TkA at the azimuth angle A are misaligned, there may be a pattern of alternating wide and narrow strips as shown in the figures, with a track TkA1 recorded by one of the recording heads being narrow and tracks TkA2 recorded by the other head being wide, for example.

Under these circumstances, if the two reproducing heads A11 and A12 are aligned at the standard pitch P0, then the track TkA1 stays within their scanning range as shown in FIG. 20A, thus providing a satisfactory reproduced signal, but at the same time, these heads A11 and A12 are also close to the tracks TkA2 next to the adjacent tracks of the track TkA1, which tracks TkA2 are wide and of the same azimuth, and thus are likely to be affected by the noise from the tracks TkA2.

Furthermore, if, for example, the two reproducing heads A11 and A12 are out of proper position so that their standard pitch P0 is increased to the pitch P1, then the track TkA1 may stay out of the scanning range of either of the reproducing heads A11 and A12, as sown in FIG. 20B.

Additionally, in this case, the reproducing heads A11 and A12 overhang the tracks TkA2 of the same azimuth, as encircled by the broken lines in FIG. 17B, suffering noise from these tracks TkA2. That is, in this case, the two reproducing heads A11 and A12 will face the worst scenario in which they cannot read recorded signals adequately from their own track TkA1 and do read recorded signals from the tracks TkA2 of the same azimuth next to the adjacent tracks of the track TkA1 as noise, thereby almost completely destroying one whole track of data.

In order to solve the above and other problems, the present invention provides a reproducing apparatus which can properly reproduce, using a non-tracking (NT) technique, multi-track data recorded by a helical scan technique even when such a worst recorded/reproducing pattern as mentioned above occurs. In one aspect of the present invention, an apparatus for reproducing data by scanning slant tracks formed on a tape-shaped recording medium a plurality of reproducing heads disposed on a rotary drum is configured as follows. The apparatus is provided with measuring means for measuring error rates by reading the data from the tracks formed on the tape-shaped recording medium by the reproducing heads disposed on the rotary drum. The apparatus is further provided with track detecting means for detecting a worst track deemed to have a highest error rate from the tracks respectively formed at predetermined cycles on the tape-shaped recording medium, based on the error rates measured by the measuring means, and head determining means for determining a pair of reproducing heads out of the plurality of reproducing heads, the pair of reproducing means are able to read data recorded on the worst track at lowest error rates based on the error rates measured by the measuring means. Then, servo control means is provided to perform tracking servo control such that the worst track is scanned by the pair of reproducing heads determined by the head determining means.

In another aspect of the present invention, a method of reproducing data by scanning slant tracks formed on a tape-shaped recording medium using a plurality of reproducing heads disposed on a rotary drum is provided. The method includes the steps of measuring error rates by reading the data from the tracks formed on the tape-shaped recording medium by the reproducing heads disposed on the rotary drum, and further detecting a worst track deemed to have a highest error rate from the tracks respectively formed at predetermined cycles on the tape-shaped recording medium, based on the error rates measured by the measuring step, and determining a pair of reproducing heads out of the plurality reproducing heads, the pair of reproducing heads are able to read data recorded on the worst track at lowest error rates, based on the error rates measured by the measuring step. Then, tracking servo control is performed such that the worst track is scanned by the pair of reproducing heads determined by the determining step.

According to the present invention, the worst track expected to be formed on the tape as, for example, a narrow track when tracks on the tape-shaped recording medium undergo variations in width and the reproducing heads are erroneously mounted can be detected based on the measurement results obtained by the measuring means or the measuring step. Additionally, the pair of heads capable of reproducing the worst track under an optimum condition, i.e., at the lowest error rates, can be determined based on the measurement results. Thus, the present invention allows a worst track such as mentioned above to be reproduced properly under an optimum condition even when tracks on a tape-shaped recording medium suffer width variations and reproducing heads suffer erroneous mounting.

And when proper reproduction can be implemented in this way even when tracks suffer width variations and reproducing heads are mounted at wrong positions, reliable performance in reading recorded signals from the tape can be ensured, thereby improving system reliability compared to conventional systems.

Furthermore, when proper reproduction can be implemented even when recorded tracks suffer width variations and reproducing heads erroneous mounting, the reproducing heads can be mounted under eased mounting tolerances across the width of a track. And the eased mounting tolerances would then contribute to easing the mechanical tolerance requirements of the rotary head drum, further improving its yields, and hence reducing its manufacturing cost.

The thus eased mounting tolerances of the recording/reproducing heads across the width of a track could be properly diverted in order to improve the recording density by narrowing the track pitch of the tape-shaped recording medium.

BRIEF DESCRIPTION OF THE DRAWINGS

FIG. 1 shows in a block diagram an example of an internal configuration of a reproducing apparatus according to an embodiment of the present invention;

FIG. 10 illustrates a reproducing technique used by a conventional helical scanning system;

DESCRIPTION OF THE PREFERRED EMBODIMENT

An embodiment will be described taking as an example a case where a reproducing apparatus of the present invention is applied to a so-called tape streamer drive as a DDS (Digital Data Storage) device for backing up data such as, computer data. FIG. 1 shows in a block diagram an internal configuration example of a tape streamer drive 1 according to this embodiment. Note that the figure mainly illustrates only a reproducing subsystem of the tape streamer drive 1, and also, ease of explanation, only four reproducing heads (7A1 to 7A4) although the drive 1 has four recording heads and eight reproducing heads as will be described below.

This tape streamer drive 1 is configured to perform helical scan recording/reproduction with respect to a magnetic tape 3$a$ in a tape cassette 3 using a rotary head drum 2. On the cylindrical surface of the drum 2 are four recording heads and eight reproducing heads, as shown in, for example, FIGS. 2A to 2C.

Figure 2A:
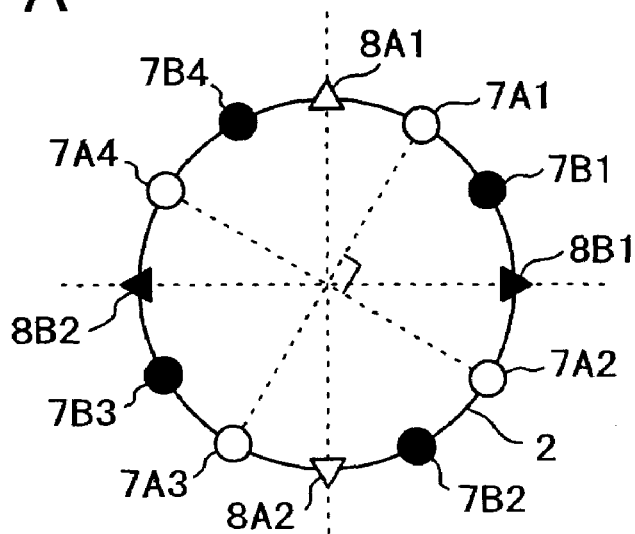
FIGS. 2A to 2C illustrate example mounting positions of recording heads and reproducing heads on a rotary head drum.
Figure 2B:
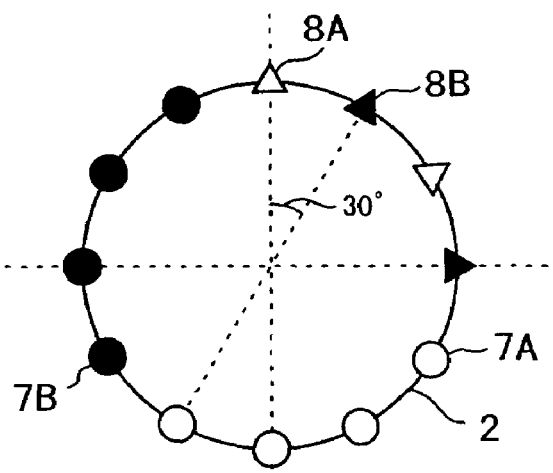
Figure 2C:
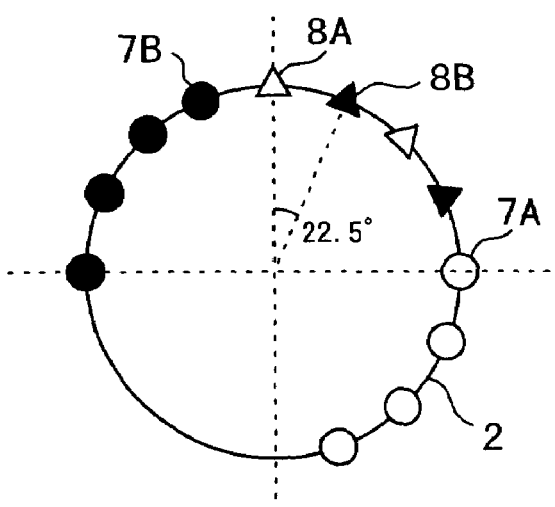

FIGS. 2A to 2C show positions at which to mount the recording heads 8 and reproducing heads 7 relative to the rotary head drum 2, in the form of a cross section of the drum 2. First, in an example shown in FIG. 2A, the respective heads are positioned 30° spaced apart from each other on the outer circumference (cylindrical surface) of the drum 2 in the order of a recording head 8A1, a reproducing head 7A1, a reproducing head 7B1, a recording head 8B1, and so on. In this case, as shown in the figure, the recording heads 8A1, 8A2 are 180° apart from each other, and so are the recording heads 8B1, 8B2. And the four reproducing heads 7A1 to 7A4 are located at 90° to the others, and so are the remaining four reproducing heads 7B1 to 7B4.

In another example shown in FIG. 2B, the recording heads 8A, 8B are arranged alternately in the order of the recording heads 8A1, 8B1, 8A2 and 8B2, and the reproducing heads follow them in the order of a group [7A1 to 7A4] and a group [7B1 to 7B4]. These heads are 30° spaced apart from each other.

In still another example shown in FIG. 2C, groups of the heads are laid out in the order of [the reproducing heads 7B1 to 7B4], [the recording heads 8A and 8B so alternating as above], and [the reproducing heads 7A1 to 7A4]. Each head is located at 22.5° to the others.

It may be confirmed that the phase of the heads relative to the magnetic tape 3$a$ do change also when each head is displaced in a direction orthogonal to the direction of drum rotation over the outer circumference of the drum 2.

Figure 11:
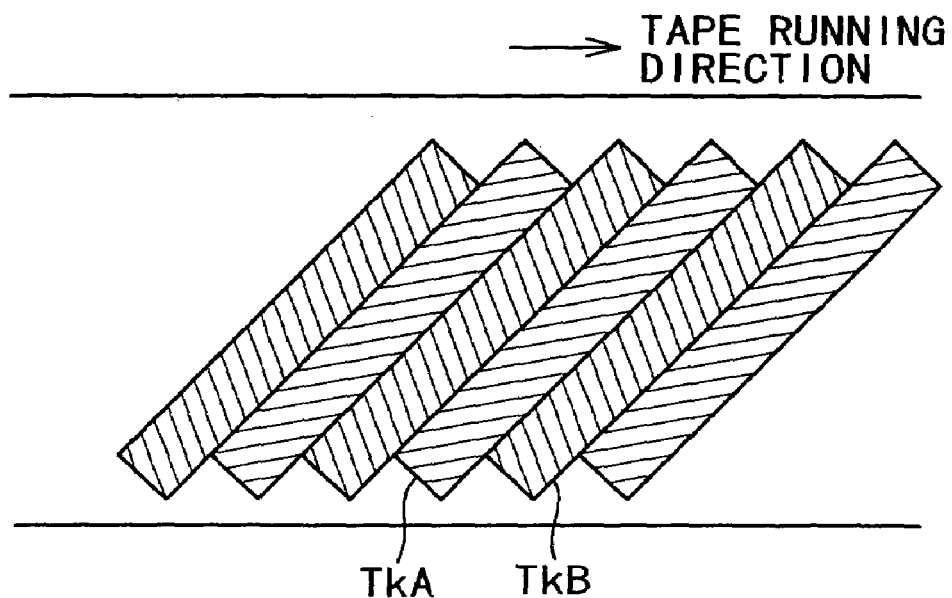
FIG. 11 illustrates an azimuth recording system.
Figure 12:
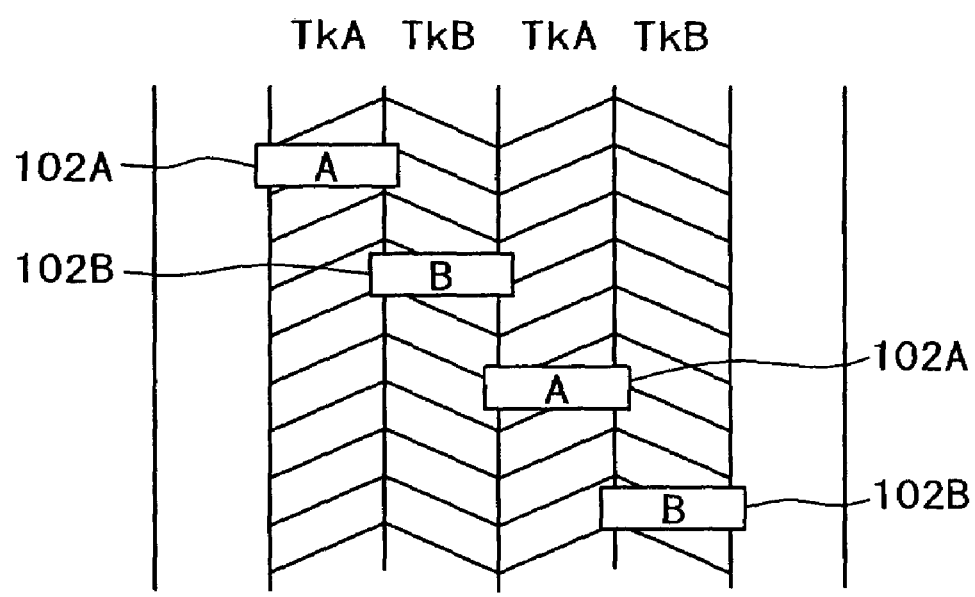
FIG. 12 illustrates a reproducing operation corresponding to the azimuth recording system.
Figure 13:
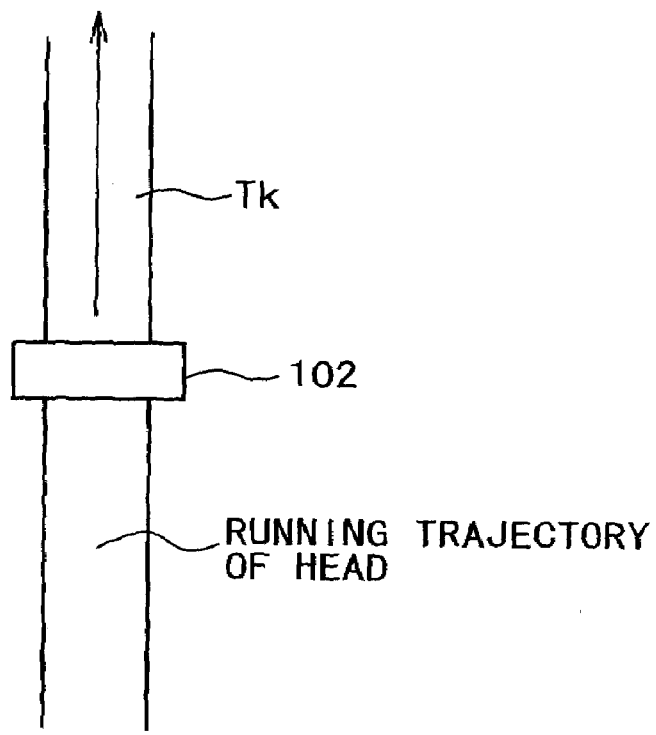
FIG. 13 illustrates a tracking servo system.
Figure 14:
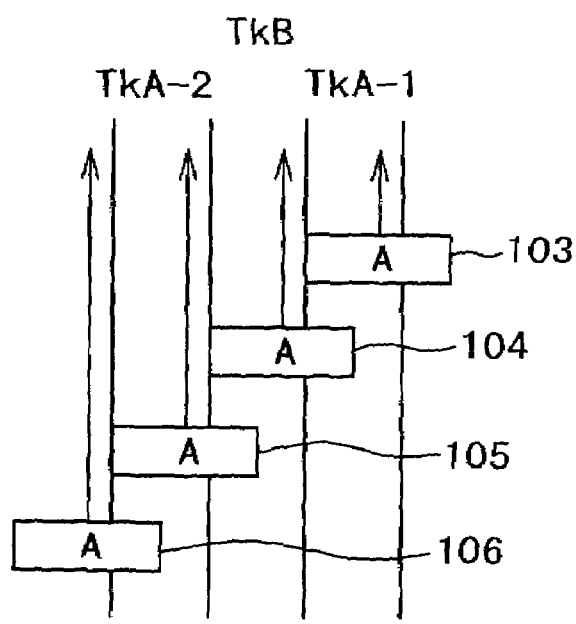
FIG. 14 illustrates a non-tracking system.

Here, the four recording heads 8 shown in FIGS. 2A to 2C record four slant tracks (channels) on the tape 3$a$ per revolution of the drum 2. In this case, one pair of recording heads 8A1, 8A2 and the other pair of recording heads 8B1, 8B2 having different azimuth angles form tracks TkA, TkB of different azimuths, respectively, as shown in FIG. 11 referred to above.

The eight reproducing heads 7 (A1–A4, B1–B4) are provided in order to reproduce, for example, the tracks TkA, TkB of the two different azimuths, alternately recorded on the magnetic tape 3$a$ by the recording heads 8, as mentioned above. Supposing in this case that, for example, the tracks TkA are recorded by the pair of heads 8A1, 8A2. That the tracks TkB by the pair of heads 8B1, 8B2, the four reproducing heads 7A1 to 7A4 have the azimuth angle corresponding to the two recording heads 8A so that they reproduce only the tracks TkA on the tape 3$a$. Also, the other four reproducing heads 7B1 to 7B4 have the azimuth angle corresponding to the other two recording heads 8B so that they reproduce only the tracks TkB on the tape 3$a$. Note that FIG. 1 depicts, for convenience, as mentioned above only the four heads 7A1 to 7A4 for reproducing the tracks TkA out of the two kinds of tracks TkA, TkB which are alternately formed to have the different azimuth angles on the magnetic tape 3$a$, respectively.

In FIG. 1, the rotary head drum 2 is driven to rotate by a drum motor 5 shown in the figure, and the magnetic tape 3$a$ drawn out from the tape cassette 3 is wrapped around the cylindrical surface of the drum at a predetermined angle. The tape 3$a$ is also forwarded by a capstan 6 driven by a capstan motor 6$a$, and a pinch roller 4.

A rotary transformer 9 transmits signals reproduced via the reproducing heads 7A disposed on the drum 2, to the apparatus. The drum 2 has an inside thereof rotated by the drum motor 5 and an apparatus side thereof fixed, as so partitioned by the rotary transformer 9. The rotary transformer 9 transmits the reproduced signal obtained from each reproducing head 7A rotating together with the drum 2, from a coil on the inside of the drum to the corresponding coil on the apparatus side. And the respective reproduced signals transmitted to the apparatus in this way are supplied to amplifiers 10$a$ to 10$d$ as shown in the figure.

The amplifiers 10$a$ to 10$d$ amplify the supplied signals for delivery to equalizing/decoding circuits 11$a$ to 11$d$, each of which performs required processing on the corresponding signal supplied, such as equalizing its frequency characteristic, providing timing reproduction, and various decoding, to produce digital data.

Address/block error detecting circuits 12$a$ to 12$d$ input digital data from the equalizing/decoding circuits 11$a$ to lid for detection of track addresses and block addresses. Additionally, they detect block error information as block-based error information about the inputted digital data. Here, in this embodiment, the digital data recorded on the magnetic tape 3$a$ has the track addresses and block addresses inserted. The track address represents a track number of each track, and the block address represents a recorded position within each track. The address/block error detecting circuits 12$a$ to 12$d$ detect these track addresses and block addresses from the digital data inputted as mentioned above, and also detect the block error information based on the block addresses thus detected.

Information about the track addresses, block addresses, and block errors detected by the address/block error detecting circuits 12$a$ to 12$d$ is supplied to a system controller 15 as shown in FIG. 1. And each of these detecting circuits 12$a$ to 12$d$ outputs only valid data which has the addresses from the inputted digital data and free from (or having less) block errors to a downstream single-channel-output memory 13 together with the address information synchronizing therewith, based on the control by the system controller 15.

The single-channel-output memory 13, e.g., temporarily holds the block-based data as well as address information synchronizing therewith supplied from the address/block error detecting circuits 12$a$ to 12$d$, and also outputs required data of single channel out of the data/address information thus held, based on control by an address order control switch (SW) 16 shown in the figure. The address order control switch 16 inputs the address information of the data outputted from each of the address/block error detecting circuits 12$a$ to 12$d$, to control the output order and output timing of the data held in the single-channel-output memory 13 based on these address information. Data of single channel outputted parallelly from the address/block error detecting circuits 12$a$ to 12$d$ is input at a timing corresponding to a writing rate to a downstream buffer memory 14 from the single-channel-output memory 13 by the address order control switch 16. Since the address order control switch 16 outputs the address information also to the buffer memory 14, the memory 14 can be informed of the address information about the data of single channel supplied from the single-channel-output memory 13.

Note that data from the heads 7B1 to 7B4 for reproducing the other tracks TkB is also input to the single-channel-output memory 1, although not shown in FIG. 1 which mainly illustrates only the system for the heads 7A1 to 7A4 reproducing the tracks TkA.

Data from the single-channel-output memory 13 is input to the buffer memory 14 and temporarily held and then outputs it based on an output track address signal and an output block address signal supplied from an address/drum rotation reference signal generating circuit 18 to be described below.

The address/drum rotation reference signal generating circuit 18 generates the output block address signal and output track address signal for instructing addresses of data for output to the buffer memory 14. The output block address signal and output track address signal are generated at cycles obtained by dividing a reproduction reference clock 17 shown in the figure. And the buffer memory 14 outputs data at the instructed addresses at such timings as the output block address signal and output track address signal are supplied. In this way, the buffer memory 14 outputs the reproduced data at a fixed data rate to a reproduced signal processing circuit which is downstream thereof. And the thus outputted reproduced signals are properly processed for compression/decompression, error correction, and the like at the reproduced signal processing circuit, for supply to, for example, a host computer and the like.

The address/drum rotation reference signal generating circuit 18 also generates a drum rotation reference signal obtained similarly by dividing the reproduction reference clock. This drum rotation reference signal is supplied to a drum servo circuit 22, which, in response thereto, controls the number of revolutions of the drum motor 5. As a result, the rotary head drum 2 driven by this drum motor 5 is rotated at a constant speed based on the reproduction reference clock 17.

An addition circuit 19, a subtraction circuit 20, and a capstan servo circuit 21 are provided in order to keep data stored in the buffer memory constant. The addition circuit 19 inputs an output track address signal from the address/drum rotation reference signal generating circuit 18 to add a predetermined value "m" to a track address value indicated by this signal, and outputs the resultant value to the subtraction circuit 20.

The subtraction circuit 20 inputs latest input track address information supplied from the address order control switch 16 to subtract therefrom the output address value having the predetermined value "m" added by the addition circuit 19. As a result, the latest input track address value to the buffer memory 14, which is "m" tracks ahead of the output track address, is to be controlled such that the output from the subtraction circuit 20 is always "0". That is, when the buffer memory 14 stores data as many as "m" tracks, the output of the subtraction circuit 20 is controlled to be always "0". Thus, when the volume of data stored in the buffer memory 14 is smaller than a reference, i.e., "m" tracks, the subtraction circuit 20 outputs a "+" value, whereas when its volume is greater than the reference, the circuit 20 outputs a "−" value.

The capstan servo circuit 21 controls the rotational speed of the capstan motor 6a according to the value inputted from the subtraction circuit 20 as a capstan servo error signal. In this case, when the capstan servo error signal is, for example, a "+" value (the volume of data stored in the buffer memory 14 is smaller than the reference), the circuit 21 controls the capstan motor 6a to rotate faster. That is, by forwarding the tape faster, the volume of data for input by the buffer memory 14 is increased. On the other hand, when the capstan servo error signal is, for example, a "−" value (the volume of data stored in the memory 14 is larger than the reference), control is effected to slow down the capstan motor 6a to decrease the volume of data for input by the memory 14. As a result of the above control, the volume of data stored in the buffer memory 14 is maintained constant at all times.

The system controller 15 is provided with a CPU, a ROM, and a RAM (which are not shown), and performs the overall control of the tape streamer drive 1. The ROM of the controller 15 stores, for example, programs for execution by the controller 15 to implement various control processing, as well as various initial settings information. The RAM appropriately holds data necessary for the controller 15 to execute the various control processing.

In this embodiment, the system controller 15 performs, for example, processes shown in FIGS. 6 to 8 to be described later, according to the programs stored in, e.g., the ROM. That is, the controller 15 performs, for example, a process of detecting a track having the highest average error rate out of tracks formed on the magnetic tape 3a based on the results of scanning operations performed over the tape 3a by the reproducing heads 7. The controller 15 also performs, for example, processing required to reproduce the track having the highest error rate at a reduced error rate. Note that these processing operations according to this embodiment will be described later in detail.

Figure 15:
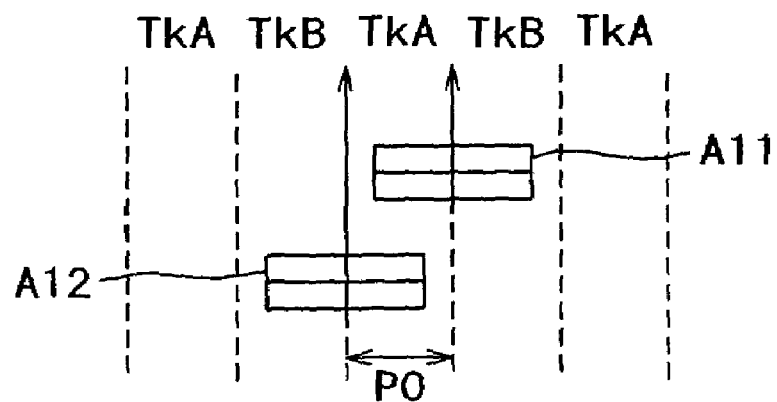
FIG. 15 shows how reproducing heads scan tracks on a magnetic tape at a standard pitch.
Figure 16:
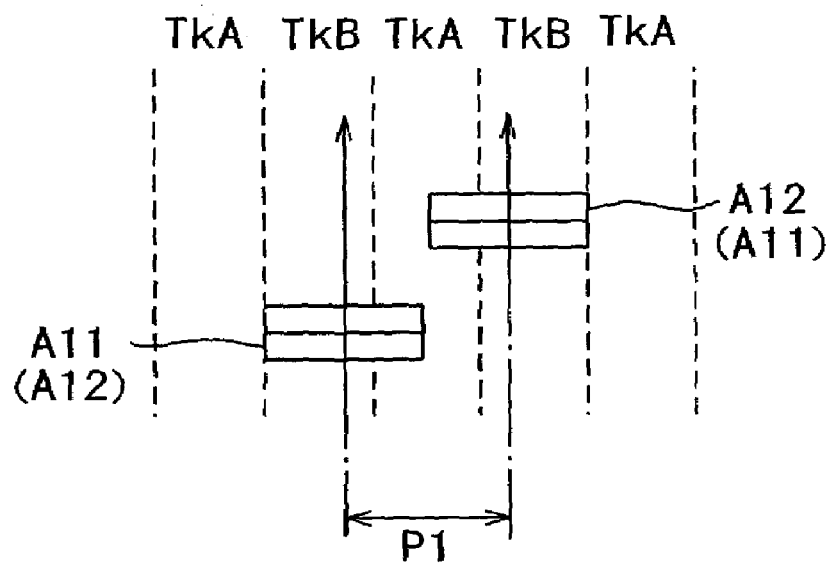
FIG. 16 shows how mispitched reproducing heads scan tracks on a magnetic tape.
Figure 17:
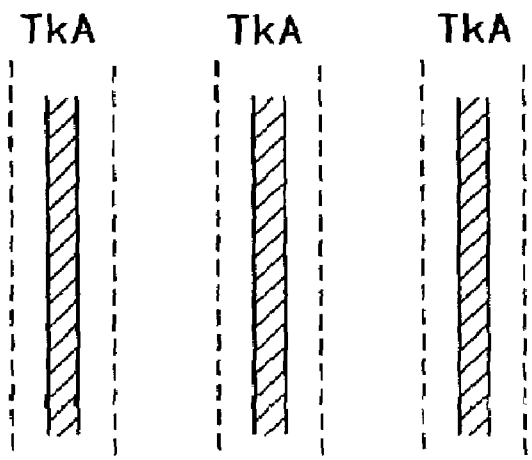
FIG. 17 illustrates an improper pattern recorded on a magnetic tape in a recording made by single recording head per azimuth.
Figure 18:
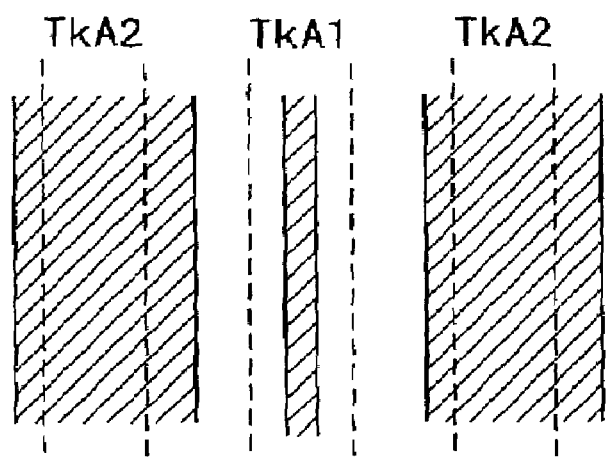
FIG. 18 illustrates an improper pattern recorded on a magnetic tape in a recording made by two recording heads per azimuth.
Figure 19A:
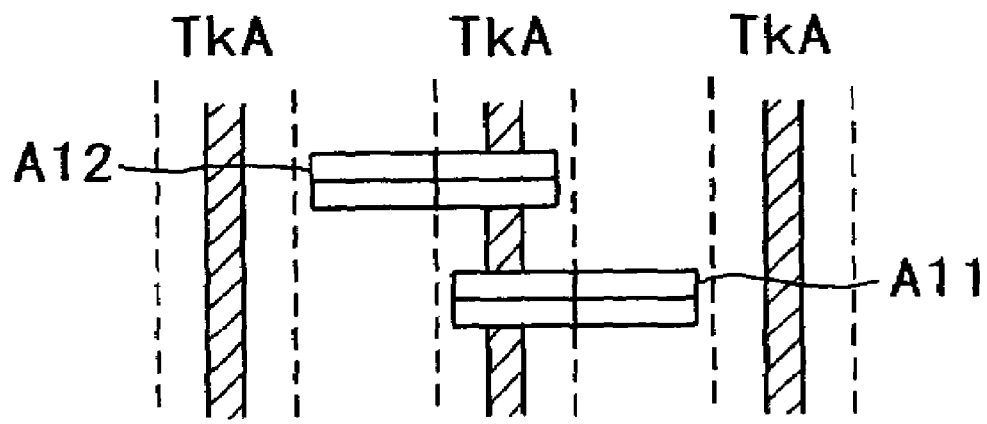
FIG. 19A illustrates an improper pattern recorded on a magnetic tape in a recording made by single recording head per azimuth.
Figure 19B:
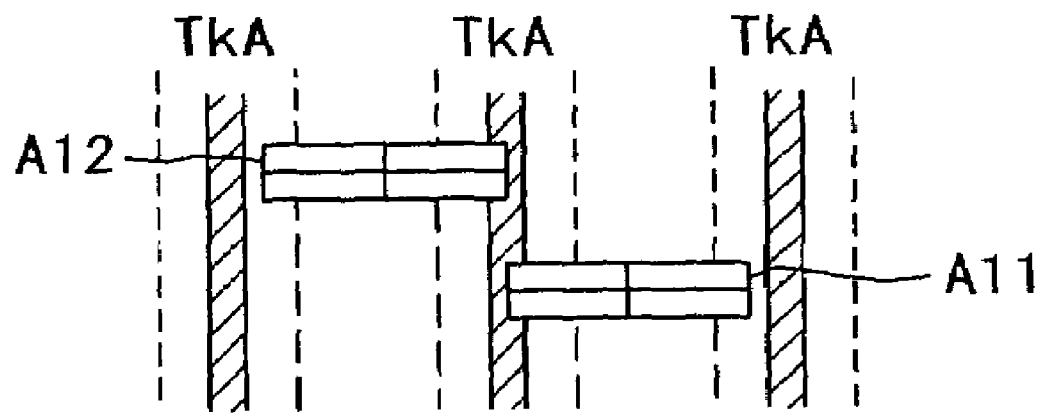
FIG. 19B illustrates an improper pattern recorded on a magnetic tape and mispitched reproducing heads, in a recording made by single recording head per azimuth.

Here, as in the tape streamer drive 1 having the above configuration, an apparatus that reproduces data using two reproducing heads 7 per track may sometimes have its reproducing heads 7A1 to 7A4 mispitched due to their mounting errors or the like, as earlier shown in FIGS. 15 and 16. In addition, if the tracks recorded on the magnetic tape 3a have narrower or wider widths as shown in FIGS. 19A, 19B, 20A, and 20B above, specific tracks may likely be reproduced improperly.

Figure 3A:
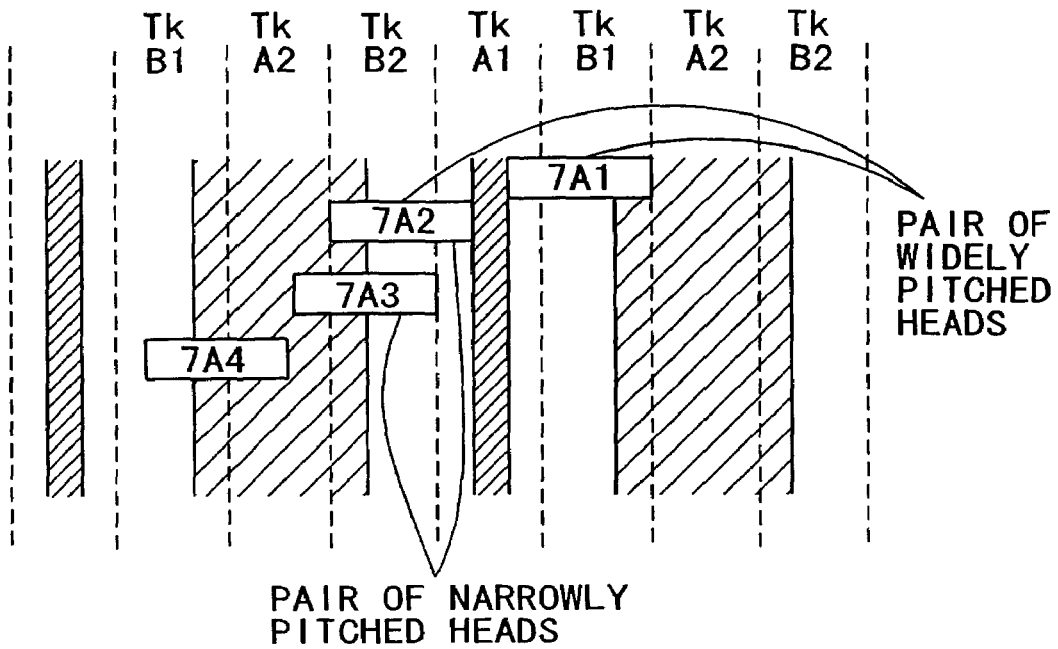
FIGS. 3A and 3B show how reproducing heads scan a magnetic tape.
Figure 3B:
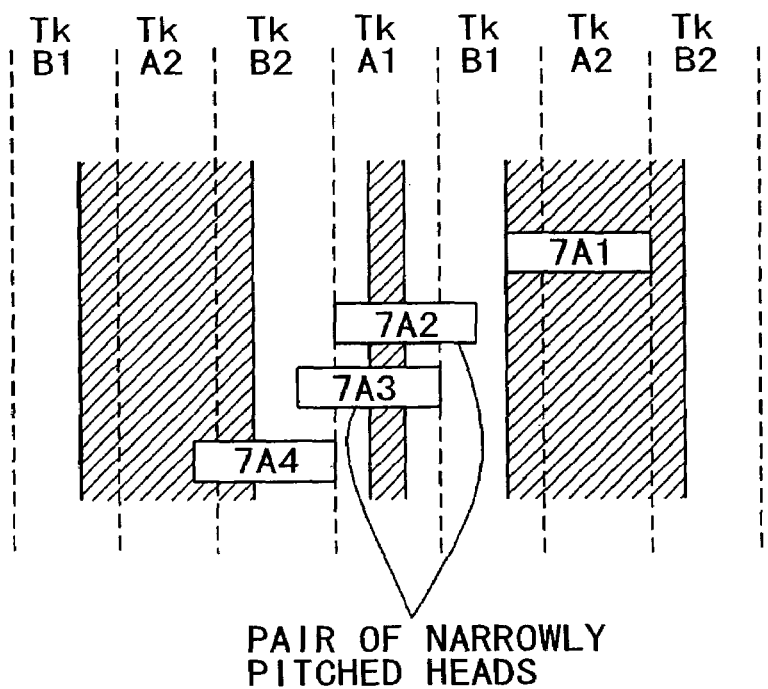

Some cases of improper scanning of the tape 3a by reproducing heads are shown in FIGS. 3A and 3B, in which a recording is made by two heads per azimuth, and, for ease of explanation, tracks are scanned only by the reproducing heads 7A. In these cases, a track TkA1 represents a track formed by the recording head 8A1 of the two recording heads 8A1, 8A2 for an azimuth A, whereas a track TkA2 represents a track formed by the other recording head 8A2. Similarly, tracks TkB1, TkB2 represent tracks formed by the two recording heads 8B1, 8B2 for an azimuth B, respectively. Note that two adjacent broken lines in the figure indicate an expected fixed track pitch.

Figure 20A:
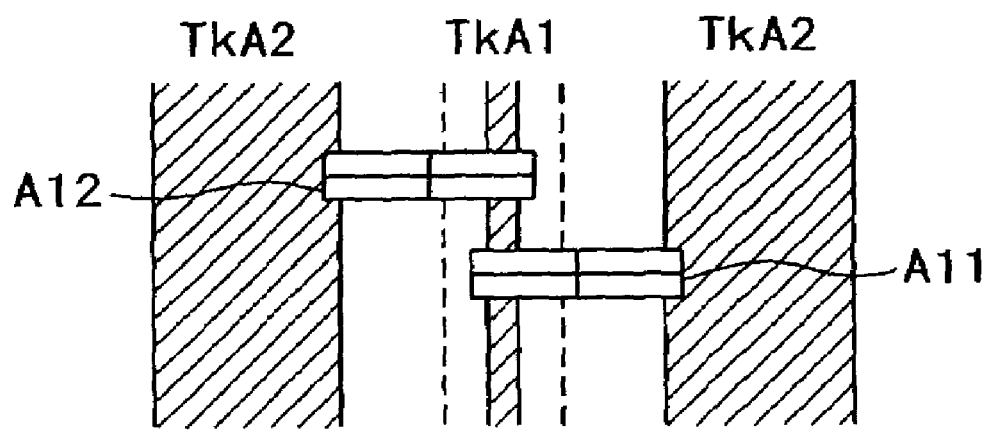
FIG. 20A illustrates an improper pattern recorded on a magnetic tape in a recording made by two recording heads per azimuth.
Figure 20B:
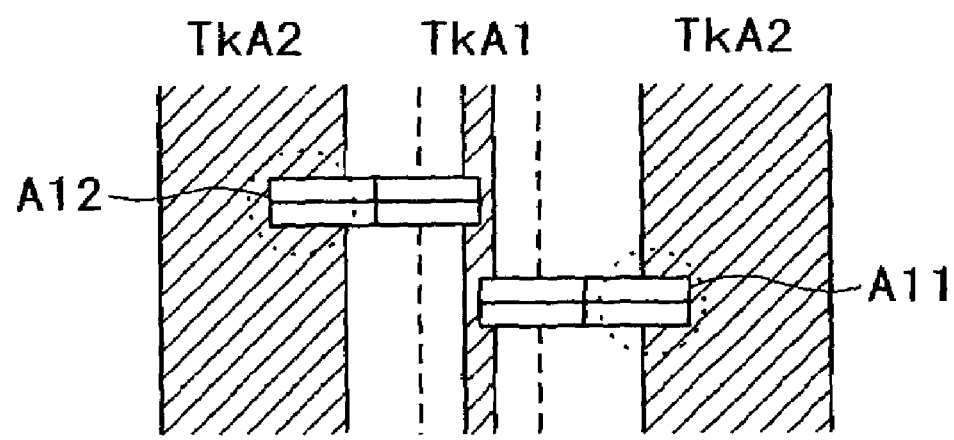
FIG. 20B illustrates an improper pattern recorded on a magnetic tape and mispitched reproducing heads, in a recording made by two recording heads per azimuth.

First, shown in FIG. 3A is a pattern of narrow tracks TkA1 and wide tracks TkA2 recorded on the tape 3a as already shown in FIGS. 20A, 20B, which is caused by the reproducing heads 7A1, 7A2 responsible for scanning the tracks TkA1 being widely pitched due to some wrong mounting of the heads 7A1 to 7A4. In this pattern, as discussed earlier, the narrow track TkA1 is to be scanned by the two widely pitched reproducing heads 7A1, 7A2, and this makes it difficult to read the recorded data properly. In addition, the tracks TkA2 of the same azimuth, which are next to the adjacent tracks of this track TkA1, grow so nearer to the track TkA1, so that the two widely pitched reproducing heads 7A1, 7A2 may overhang these tracks TkA2, respectively. From this arises the worst situation in which the mispitched reproducing heads 7A1 and 7A2 are unable to properly read the track TkA1 they are responsible for, and also affected by noise from the tracks TkA2 next to the tracks adjacent to their track TkA1.

By the way, if, for example, there is a pair of widely pitched reproducing heads (7A1, 7A2) due to erroneous mounting of the reproducing heads 7A1 to 7A4 as above, there should naturally be a pair of narrowly pitched reproducing heads since the heads are provided on the cylindrical surface of the rotary head drum 2. Let is be supposed in this case that the reproducing heads 7A1 to 7A4 are mounted at such positions as shown in, for example, FIG. 2A. And if, for example, the reproducing head 7A2 is misaligned so as to be closer to the reproducing head 7A3, then the heads 7A1, 7A2 are pitched far, whereas the heads 7A2, 7A3 are pitched near. This is confirmed also in FIG. 3A that a pair of narrowly pitched heads 7A2, 7A3 should result from a pair of widely pitched reproducing heads 7A1, 7A2.

Thus, in this embodiment, the narrow track is scanned by such two narrowly pitched heads. That is, as shown in FIG. 3B, for example, the two narrowly pitched reproducing heads 7A2, 7A3 are used to scan the narrow track. This permits the narrow track TkA1 to be scanned reliably, and further unaffected by the noise from the wide tracks TkA2 next to its adjacent tracks as shown in the figure. In summary, even when reproducing heads 7A1 to 7A4 suffer some erroneous mounting and an improper pattern of narrow and wide tracks occurs as to the same azimuth on the magnetic tape 3$a$, it is designed such that their data can be reproduced under an optimal scanning condition.

In order to do this, first, which channel has such a narrow track is to be detected. In this embodiment, such detection involves first causing all the reproducing heads 7 (A1 to A4, B1 to B4) to scan tracks on the tape 3$a$ for some seconds, and then finding a track having the highest average error rate from the detection result. More specifically, a predetermined number of tracks on the tape 3$a$ are scanned by all the reproducing heads, and a track having the lowest rate of satisfactory reproduction is found from the result. And the track having the lowest rate of satisfactory reproduction is recognized as a narrow track in an improperly recorded pattern such as mentioned above.

Figure 5A:
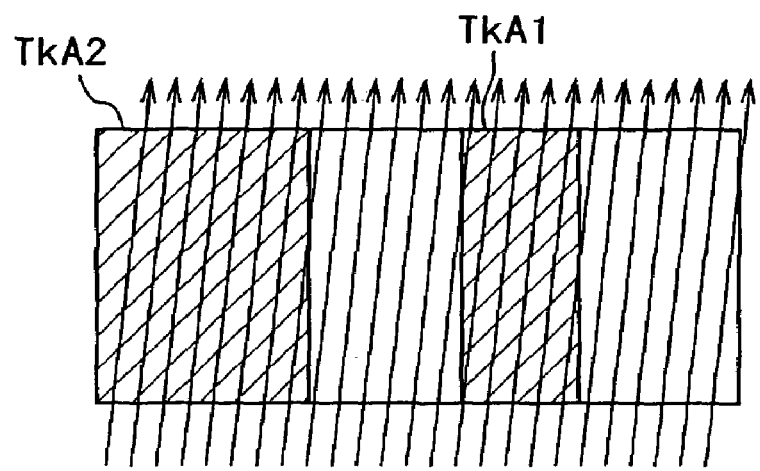
FIGS. 5A and 5B conceptually illustrate the principles of how a worst track and a pair of best heads are found from error information measurement.

This will be elaborated with reference to, for example, FIG. 5A. Assuming that the reproducing head 7A1 scans in the direction of the arrow in the figure, it is seen from the figure that this head 7A1 scans the wider track TkA2 more often times. That is, a wider track TkA2 is reproduced satisfactorily at a higher rate, which, in contrast, means that a narrower track is scanned less by the reproducing head 7A1, and hence at a lower rate of satisfactory reproduction. Thus, such a track having a lower rate of satisfactory reproduction and thus having the highest average error rate as scanned by each reproducing head is recognized as a narrow track such as mentioned above.

In this embodiment, error rates are measured, for example, by forwarding the tape more slowly than during normal reproduction (recording). That is, the reproducing heads 7 are caused to scan the tracks at a normal drum rotating speed after making the tape forwarding speed slower than the normal tape forwarding speed, to cause each of the reproducing heads 7 (A1 to A4, B1 to B4) to scan the tracks while gradually shifting its phase per revolution of the drum.

Figure 4A:
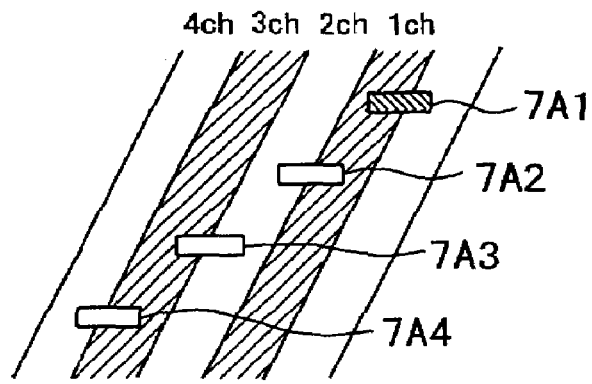
FIGS. 4A to 4C illustrate phase shifts of reproducing heads at the time the heads scan the tape at a slower tape forwarding speed than that of recording period.
Figure 4B:
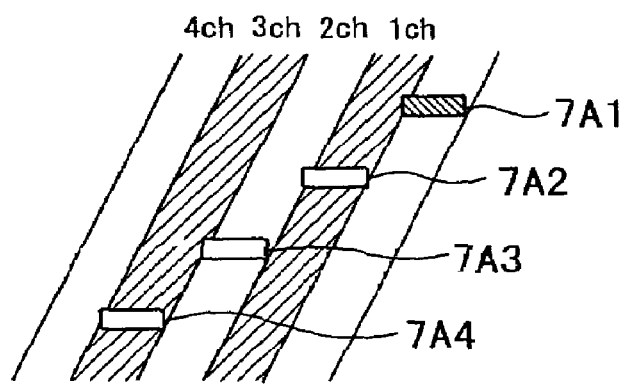
Figure 4C:
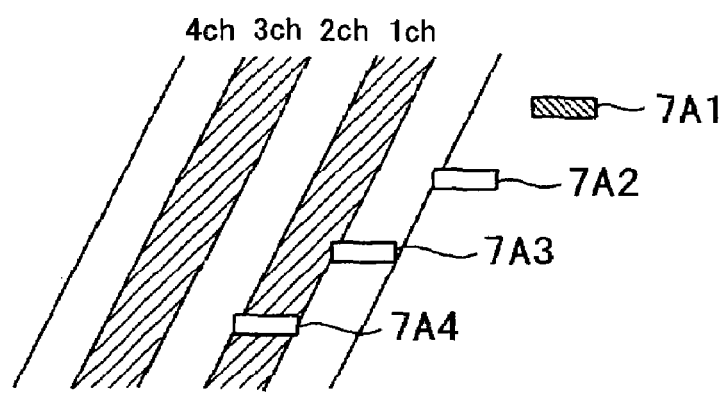

Turning now to FIGS. 4A to 4C, how such scanning is carried out will be described. Supposing that the reproducing heads 7 are scanning tracks at such a phase relationship as shown in, for example, FIG. 4A, and if the tape forwarding speed is equivalent to that during normal reproduction (recording), then their phase relationship with respect to the tracks (channels) little changes from a state shown in FIG. 4A, despite the number of revolutions made by the rotary head drum 2. That is, in this case, since the recording pitch is equivalent to the reproduction pitch, the reproducing heads 7 hardly occur out of phase with the tracks. By contrast, when scanning is performed at a lower tape forwarding speed than the normal speed, the reproducing heads shift out of phase with the tracks in the tape running direction shown in the figure every time the drum 2 makes a revolution.

Assuming, for example, that scanning is performed at a tape forwarding speed 2% slower than the normal speed, the respective reproducing heads 7, responsive thereto, come to scan the tracks while shifting their phase (position) $^2/_{100}$ across a width as wide as four tracks 1 ch to 4 ch. Assuming that the phase of the reproducing heads 7 in a first revolution of the drum is in the state shown in, for example, FIG. 4A, their phase in a tenth revolution of the drum is shifted in the tape forwarding direction as shown in, for example, FIG. 4B. And their phase in a thirtieth revolution of the drum is further shifted in the tape forwarding direction as shown in, for example, FIG. 4C. And these reproducing heads 7 come to scan, in a fiftieth revolution, such positions as would be defined by a forty-ninth revolution of the drum under the normal tape forwarding speed, to bring their phase back to the state of FIG. 4A.

The scanning at a lower tape forwarding speed hence causes each reproducing head to scan tracks with its phase shifted relative to the tracks. In other words, each track is scanned by all the reproducing heads at various phases. Thus, each track on the magnetic tape 3$a$ is scanned by all the reproducing heads at various phases, whereby the above-mentioned error rates can be measured.

After having detected the track equivalent to a narrow track in an improperly recorded pattern in the above way, a pair of reproducing heads 7, 7 optimal for scanning this narrow track is determined. That is, a pair of narrowly pitched reproducing heads such as shown in FIG. 3B above is detected. In the case of this embodiment, such detection is performed in accordance with error rates calculated when all possible pairs of adjacent reproducing heads on the rotary head drum 2 scan the above-mentioned track having the highest average error rate. That is, a pair of reproducing heads having the lowest error rates thus calculated is recognized as a pair of reproducing heads having the narrowest pitch.

Figure 5B:
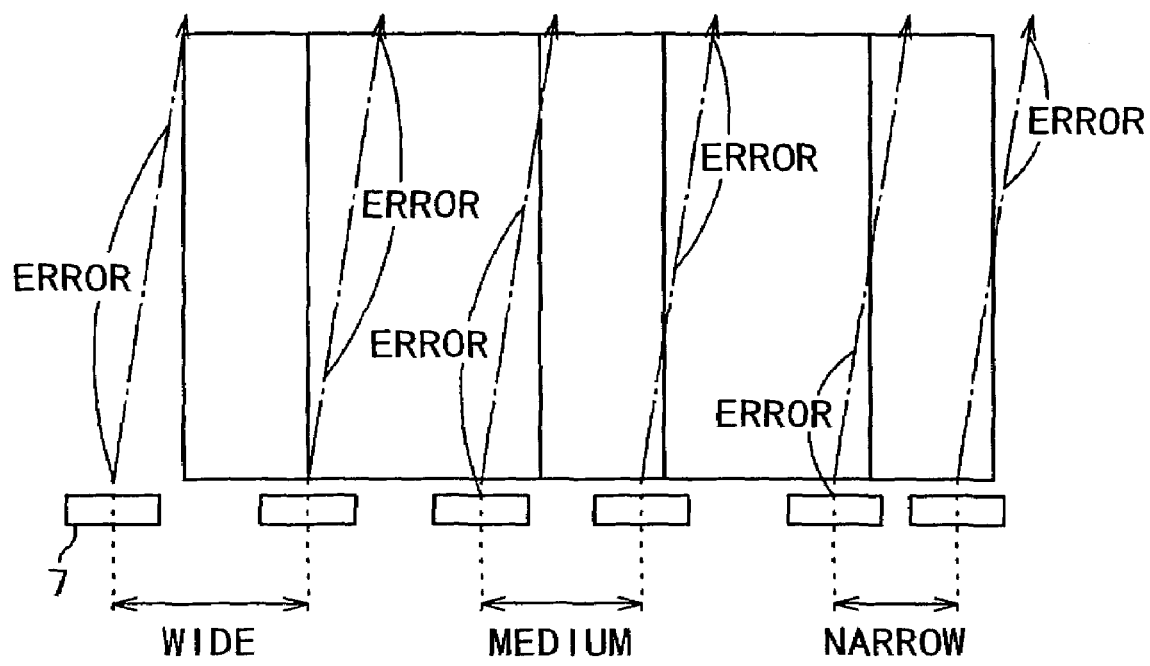

In this case, as shown in, for example, FIG. 5B, the more widely the two reproducing heads 7A, 7A are pitched, the more errors their read signals suffer (see portions indicated by the one-dot chain lines in the figure). That is, the higher the error rates in the signals read by the two reproducing heads 7A, 7A, the wider the pitch between them. Similarly, the narrower their pitch, the lower their error rates, and the lower their error rates, the narrower their pitch. Thus, a pair of reproducing heads producing signals having the lowest error rates via the above measurement is recognized as a pair of reproducing heads having the narrowest pitch.

In calculating these error rates, it is designed, for example, that the two adjacent reproducing heads 7A, 7A scan the track having the highest error rate just evenly. That is, error rates so calculated as the respective pairs of reproducing heads 7A, 7A scanning the track while placing the track exactly in the middle thereof widthwise (see a position Y in FIG. 9) will be used for comparison.

Whether the two reproducing heads 7A, 7A are scanning the track just evenly is determined by whether the signals read by these heads during their scanning of the track in question are uniform or not. And by comparing the thus calculated error rates, which pair of reproducing heads is most narrowly pitched is detected.

In this way, a narrow track in improperly recorded patterns such as shown in FIGS. 3A and 3B above as well as a pair of reproducing heads 7A, 7A capable of scanning this narrow track at the best error rate are recognized through the above measurement. And once the narrow track and the pair of most narrowly pitched reproducing heads 7A, 7A have been thus recognized, tracking servo is started in which the tape forwarding speed is controlled via the capstan servo circuit 21 such that the narrow track is constantly scanned by the pair of narrowly pitched reproducing heads 7A, 7A. As a result, even when a recorded pattern on the magnetic tape 3*a* includes tracks of inconsistent widths, and further the reproducing heads 7 are mispitched due to erroneous mounting, data can be reproduced under an optimum scanning condition.

Note that the measuring operation for detecting the above-mentioned narrow track and pair of narrowly pitched reproducing heads 7A, 7A capable of scanning that narrow track at optimum error rates is to be performed before starting reproduction from the magnetic tape 3*a*, for example, upon loading the tape cassette 3 into the tape streamer drive 1. Furthermore, a track having the highest average error rate obtained by such measurement will be called "worst track", and a pair of reproducing heads 7A, 7A having been able to reproduce the worst track at the lowest error rates will be called "best heads", whenever applicable hereinbelow.

Now, processing performed by the system controller 15 shown in FIG. 1 in order to implement the above operation of this embodiment will be described with reference to the following flowcharts of FIGS. 6 to 8. Referring first to FIGS. 6 and 7, steps performed when detecting the worst track and the pair of best heads will be described. In FIG. 6, in step S101, the system controller 15 controls various parts to scan tracks for reproduction for "a" seconds at "n×" speed. That is, a preparatory step for starting the measuring operation performed to detect the worst track and the pair of best heads is performed. As already mentioned, this step S101 should precede the start of reproduction from the magnetic tape 3*a*, and thus may be triggered by, for example, the loading of the tape cassette 3 into the tape streamer drive 1.

In step S101, as mentioned earlier, n=0.98× speed (a tape forwarding speed 2% slower than during normal reproduction) is used to control the various parts to scan the tracks as long as single second. In this way, all the reproducing heads 7 reproduce the tracks on the tape 3*a* while shifting their phase with respect to the tracks. Note that the tape forwarding speed and the measuring time for this "pre-scanning" operation may be set to any values, but a tape forwarding speed near 1× could provide high-resolution measurements.

Then, in step S102, input is started of block error information and address information synchronizing therewith from the address/block error detecting circuits 12*a* to 12*d* shown in FIG. 1. And the inputted information is then held in, for example, the RAM of the system controller 15.

In step S103, passage of "a" seconds set as the measuring time is monitored. That is, in this case, whether or not "1" second set as the measuring time has elapsed is checked. If so, in step S104, the scanning operation for reproduction and the input operation of the block error/address information started in steps S101 and S102 are terminated to terminate the measuring operation.

Then, in step S105, average error rates are calculated for each track in accordance with all the inputted items of block error information and their corresponding address information synchronizing therewith. In this embodiment, this calculation may be performed, for example, as follows. That is, all the items of block error information inputted by the measuring operation and held in, for example, the RAM are distributed per track in accordance with their corresponding address information. And the block error information thus distributed per track is averaged as track-based error rates.

In this way, track-based average error rates, which are based on all the block error information obtained from the measuring operation, are calculated.

Subsequently, in step S106, a track having the highest calculated error rate is recognized as the worst track. That is, a track having the highest one of the average error rates calculated for each track in the above way is recognized as the worst track mentioned earlier. After having thus recognized the worst track, the process goes to step S107 shown in FIG. 7.

In step S107, error rates at the time two adjacent reproducing heads 7 scan the worst track thus recognized are calculated per pair of such heads based on all the block error/address information obtained through the above measurement. In this case, for example, scanning of only single track TkA will be considered. If the four reproducing heads 7A1 to 7A4 are arranged as shown in, for example, FIG. 2A, there may be four pairs of adjacent heads: [7A1–7A2], [7A1–7A4], [7A2–7A3], and [7A3–7A4]. That is, in this case, the block error information/address information of these four reproducing heads 7A1 to 7A4 obtained via the measurement is distributed for each of these four pairs. Then, after having thus distributed the block error/address information per pair of reproducing heads, error rates at the time each pair of reproducing heads 7 scans the worst track just evenly are calculated based on the above block error/address information. That is, error rates at the time the reproducing heads 7 in each pair scan the worst track while placing the worst track just in the middle thereof are calculated.

To do so, first, all the items of block error information at the time the two reproducing heads in each pair scan the worst track are extracted based on the address information synchronizing with the respective items of the thus distributed block error information. Then, all error rates at the time the respective reproducing heads 7, 7 in each pair scan the worst track are calculated based on the extracted block error information. After that, from this error information, error rates of the two scanning operations performed by each pair of reproducing heads 7, 7 which are uniform are extracted. As a result, the error rates at the time the two adjacent reproducing heads 7, 7 scan the worst track when the worst track placed in the middle thereof can be calculated.

In step S108, a pair of reproducing heads 7, 7 having the lowest error rates thus calculated is recognized. That is, the pair of best heads mentioned earlier is recognized. Then, in the following step S109, information about the worst track recognized in step S106 and the pair of best reproducing heads 7, 7 recognized in step S108 is held as head phase servo information. That is, as mentioned earlier, this information is held so as to control the capstan servo circuit 21 to have the pair of best heads always scan the worst track. After the information of the worst track and the best track has been held in, for example, the RAM in step S109, the process is terminated as shown in the figure.

Figure 8:
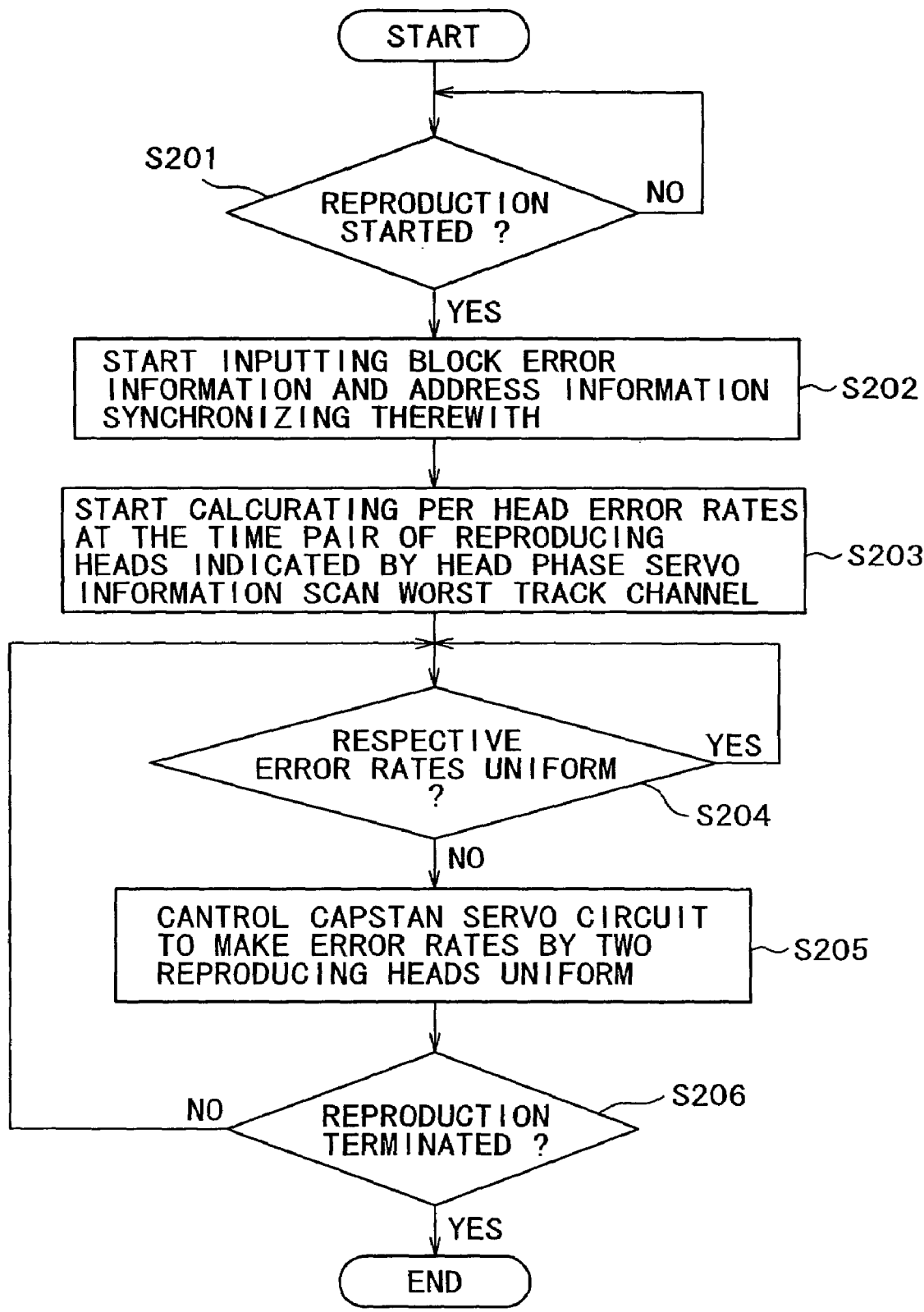
FIG. 8 is a flowchart illustrating an operation of performing tracking servo control such that the worst track is scanned by a pair of best heads, in a reproducing apparatus according to the embodiment.

Turning then to FIG. 8, an operation will be described which controls the capstan servo circuit 21 such that the worst track is always scanned by the pair of best heads. First, in step S201, the system controller 15 monitors start of the reproduction. When the start of the reproduction from the magnetic tape 3*a* has been confirmed in step S201, for example, upon detection of a specific manipulation, the process goes to step S202 to start inputting the block error information and the address information synchronizing therewith from the address/block error detecting circuits 12*a* to 12*d* shown in FIG. 1.

Then, in step S203, calculation is started as to the error rates at the time the respective best reproduction heads 7, 7 indicated by the head phase servo information scan the worst track. And in step S204, it is decided whether or not the error rates thus calculated as to the best heads 7, 7 are uniform. That is, by checking if the error rates of the respective ones of the pair of best reproducing heads 7, 7 are uniform, it is then decided whether these heads 7, 7 scan the worst track while placing the worst track just in the middle thereof.

If, for example, the best heads 7, 7 are scanning the track in question just equally, their error rates become uniform. Thus, by detecting any error rates which are not uniform, a state of the best heads is detected in which they are scanning the track off its center. If it is decided that the thus obtained error rates are uniform in step S204, this step S204 is successively performed until error rates that are not uniform are found, in which case, the process then goes to step S205.

In step S205, the capstan servo circuit 21 is controlled to make the error rates of the best reproducing heads 7, 7 uniform. In this case, if, for example, the error rate of one of these heads 7, 7 is increasing, that head 7 is scanning off the center of the track in question, and at the same time, the other head 7 is also off the track in a manner approaching its center. If, for example, the head 7 having its error rate increasing, i.e., if the head 7 off the center of the track is scanning a portion of the track width towards the tape forwarding direction, a "+" error signal is supplied to the capstan servo circuit 21 to increase the tape forwarding speed, whereby the phase of the paired heads 7, 7 can be corrected so as to scan the worst track with the track placed equidistantly from their extremities. On the other hand, if, for example, the same reproducing head 7 having its error rate increasing (deviating from the center of the track) is scanning the portion of the track which is opposite in the tape forwarding direction, then a "−" error signal is applied to the capstan servo circuit 21 to slow down the tape forwarding, whereby these best heads can have their phase re-adjusted to bring the worst track back just in the middle for proper scanning. In this step S205, the capstan servo circuit 21 is controlled, for example, in the above way.

Then, in step S206, it is determined whether or not, for example, a certain manipulation to stop the reproduction is performed to terminate the reproduction from the magnetic tape 3a. If not, the process returns to step S204, as shown in the figure, to determine whether the error rates of the best reproducing heads 7, 7 are uniform or not. Otherwise, the process shown in the figure is terminated.

Note that the above description is given on the assumption that the azimuth angle of a track formed on the magnetic tape 3a is substantially in phase with the scanning angles of reproducing heads 7, 7, and the meandering of a track is within a specified range, as in an ideal state. That is, when, for example, recording on and reproduction from the tape 3a are performed by different apparatuses, respectively, recorded tracks may, in some actual situations, be out of phase with the scanning angles of reproducing heads. In addition, some tracks may meander on the width direction along the tape 3a. When the tracking servo control such as shown in FIG. 8 is performed under these situations, it would be more likely that reproducing heads will fail to follow their corresponding tracks due to limitations in the capstan (tape forwarding) servo control range specified to change their phase.

Figure 9:
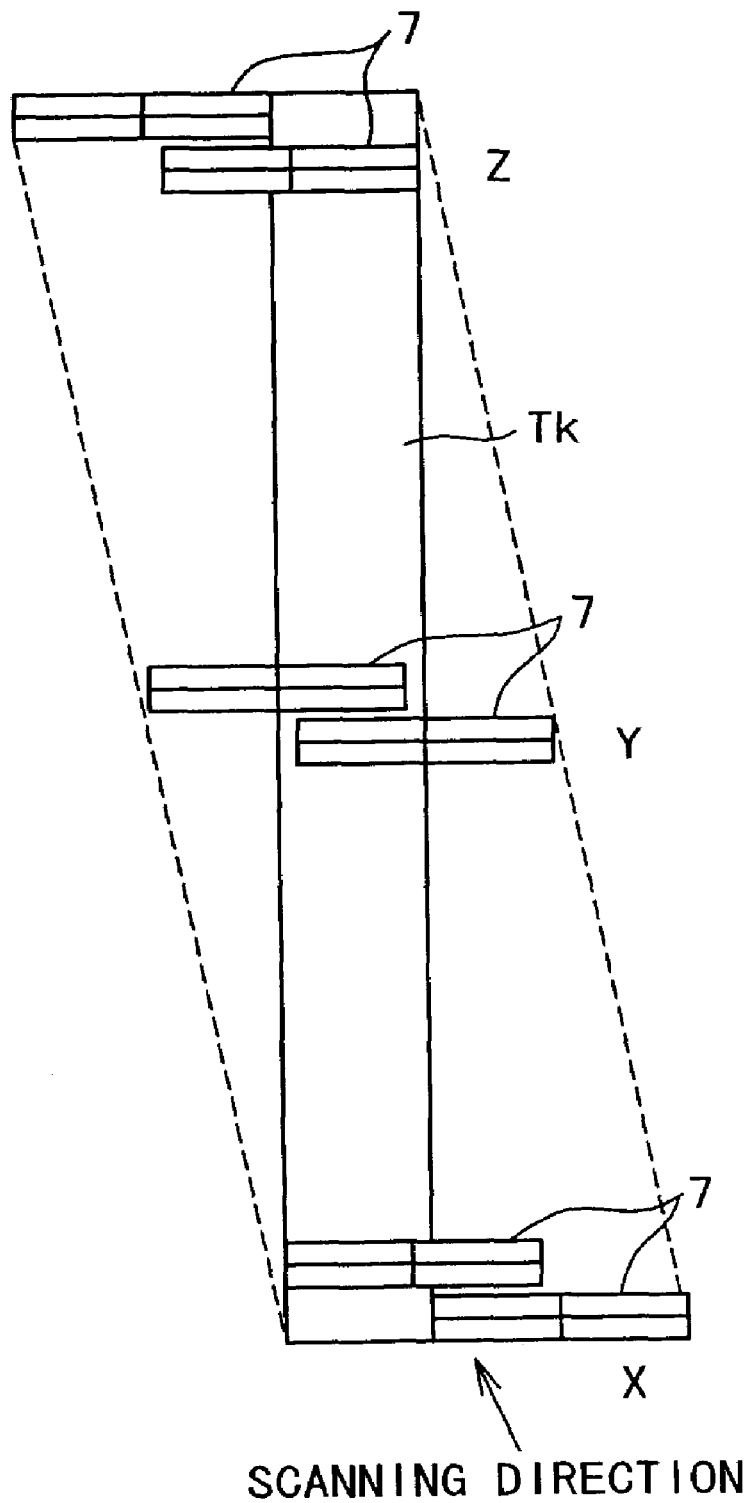
FIG. 9 illustrates a tracking servo control operation corresponding to out-of-phase track angles and meandering tracks.

To accommodate such situations, first, these out-of-phase angles and meandering track widths are to be controlled at least within a range of, for example, one to two tracks, which would reasonably be practicable in terms of current mechanical tolerance requirements. Having guaranteed that such out-of-phase and meandering tolerances are satisfied, tracking servo control is effected, as shown in FIG. 9, such that the state in which the best paired reproducing heads scan the track just evenly can be attained, for example, only in the middle of the track in the longitudinal direction (the position Y in the figure). In this way, the track in question can be made to stay within such a scanning range of the two reproducing heads 7, 7 as indicated by the broken lines in the figure.

Let it be assumed in FIG. 9 that the slant angle of the track Tk is out of phase with the scanning angle of the two reproducing heads 7, 7, for example, as indicated by the broken lines. Then, in this case, if tracking servo is controlled such that the heads scan the track just equally only in the middle of the track as mentioned above, then the right-hand reproducing head 7 first scans the tape off the track Tk around a start point denoted as X in FIG. 9, but thereafter come to scan the tape on the track Tk. Then, as the heads 7, 7 pass the middle of the track Tk (the position Y in the figure), and approach an end point (a position Z), the left-hand head 7 gradually get away from the track Tk, and the right-hand head in turn moves in to scan the tape on the track Tk. That is, by controlling the tracking servo such that the best paired reproducing heads scan the worst track just evenly only in the middle of the track Tk in the above way, either of the best paired heads scans the worst track Tk throughout the magnetic tape, as long as the track Tk angle is out of phase with the scanning angle within a specified range.

Similarly, when the track meanders along the length of the magnetic tape 3a, such tracking control is performed that the heads scan the track just evenly in the middle, whereby the state in which either one of the heads is constantly scanning the track can be maintained. That is, in this case, if, for example, a track meanders leftward, control is performed to have the meandering portion scanned by the left-hand head 7. Similarly, a track meandering rightward is brought to be covered by the scanning range of the right-hand head.

In order to achieve the state of two reproducing heads 7, 7 scanning the track just evenly in the middle of the track in the above way, tracking servo control may be effected such that the error rates during their scanning of the center block in the track become uniform. In order to do so, the error rates of the respective best reproducing heads 7, 7 during their scanning of the center block in the worst track may be calculated in accordance with the address information synchronizing with the block error information, in step S203 shown in FIG. 8 referred to above. Then, in step S205, the capstan servo circuit 21 is so controlled as to make these error rates uniform.

In the foregoing, the tape streamer drive 1 according to this embodiment has been described. As mentioned above, in this embodiment, the reproducing heads 7 are made to scan by forwarding the magnetic tape 3a at a speed lower than in normal scanning, to measure error information. And based on the thus obtained error information, the worst of the four tracks recorded on the magnetic tape 3a, which has the highest (worst) average error rate, is detected. Then, the error rates at the time all pairs of reproducing heads 7 scan the worst track thus detected are calculated, and from these error rates, the pair of reproducing heads 7 is detected which has been able to read the worst track at optimal error rates. Thereafter, tracking servo control is performed so as to allow the worst track to be scanned constantly by the pair of reproducing heads 7 thus detected. As a result, the tape streamer drive 1 according to this embodiment can reproduce data under an optimum scanning condition even when tracks on the tape 3a suffer variations in width and the reproducing heads 7 are mounted erroneously on the rotary head drum 2.

And as a result, the tape streamer drive 1 according to this embodiment can ensure satisfactory performance in reading recorded signals even when recorded tracks undergo width variations and reproducing heads suffer erroneous mounting, whereby system reliability can be improved compared to conventional systems.

Furthermore, when proper reproduction can be implemented even when recorded tracks suffer width variations and reproducing heads suffer erroneous mounting as in the above way, the reproducing heads can be mounted under eased mounting tolerances across the width of a track. And the eased mounting tolerances would then contribute to easing the mechanical tolerance requirements of the rotary head drum, further improving its yields, and hence reducing its manufacturing cost.

The thus eased mounting tolerances of the recording/reproducing heads across the width of a track could be diverted in order to improve the recording density by narrowing the track pitch of the tape-shaped recording medium.

By the way, as is understood from the foregoing description, in the tape streamer drive 1 according to this embodiment, tracking servo control is performed, unlike in conventional NT reproducing systems. For example, in a conventional NT system not involving strict tracking, there is no guarantee that the slant angle of a track will coincide with the scanning angle of a head. For this reason, each head performs scanning in a manner stepping across a plurality of tracks per revolution of the drum. Therefore, each reproducing head 7 in this case does not read data along single track, but read only block data within each track in a manner crossing a plurality of tracks.

Thus, the NT system would require some revolutions of the drum to read all the data along each track. And in order to perform this, the NT system is provided with a memory for buffering the block data of each track, and outputs data of single track after such data of single track is ready, to output reproduced data at a stable rate. In the case of, for example, an apparatus designed for four-channel recording as in this embodiment, it is arranged, for example, that each reproducing head 7 scans data by stepping across a maximum of sixteen tracks. And this requires a buffer memory 14 having a storage capacity for data as many as sixteen tracks.

By contrast, in this embodiment, tracking servo control is performed as described earlier, and thus no buffer memory would theoretically be required. However, actually, there is no guarantee that the track angle will be in phase with the scanning angle, for example, upon start of scanning, such as upon start of reproduction. In addition, as described earlier, if different apparatuses are used for recording and reproduction, there would be no guarantee that the track angle and the scanning angle will be in phase with each other. Thus, tracking servo might be performed so as to cross a plurality of tracks. For the above reason, the tape streamer drive 1 according to this embodiment would also be provided with a buffer memory 14 as in the NT-based reproducing systems. And this is why the tape streamer drive 1 is provided with the buffer memory 14 shown in FIG. 1 referred to earlier.

However, in this embodiment, as is understood from the foregoing description, relatively strict tracking servo control is performed, and thus the number of tracks crossed can be reduced more reliably than in the conventional systems. The number of tracks crossed could be reduced to, for example, about two in this case, depending on mechanical tolerances required of the apparatus. That is, this teaches that the storage capacity of the buffer memory 14 according to this embodiment could be greatly reduced compared to those of the conventional systems. And this would permit one to select a buffer memory 14 being less expensive and having less capacity for the tape streamer drive 1, leading to a reduction in the manufacturing cost of the apparatus.

While the example in which the reproducing apparatus of the present invention is applied to a so-called DDS that backs up data such as computer data has been described in the above embodiment, the present invention is not limited thereto, but is also applicable to, for example, apparatuses capable of reproducing MICRO-MV (MPEG VIDEO) cassette tape on which chiefly video/audio data is recorded, to DATs (Digital Audio Taperecorders), and the like. That is, the present invention is suitably applicable to reproducing apparatuses as long as those apparatuses reproduce data by reading tracks formed by a plurality of recording heads in a helical scan technique, using reproducing heads 7 that scan such tracks a plurality of times.

Figure 6:
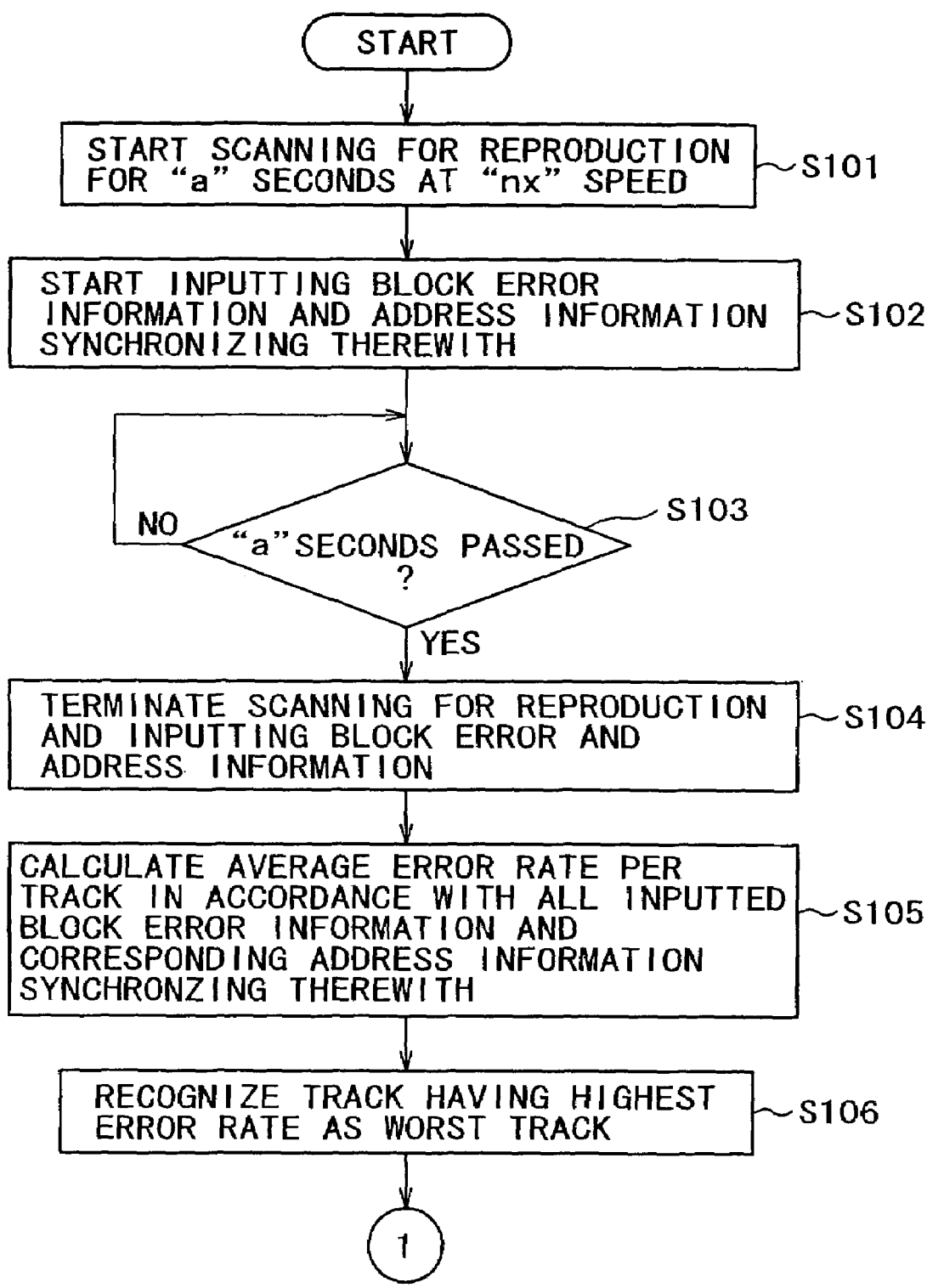
FIG. 6 is a flowchart illustrating an operation of detecting a worst track in a reproducing apparatus according to this embodiment.
Figure 7:
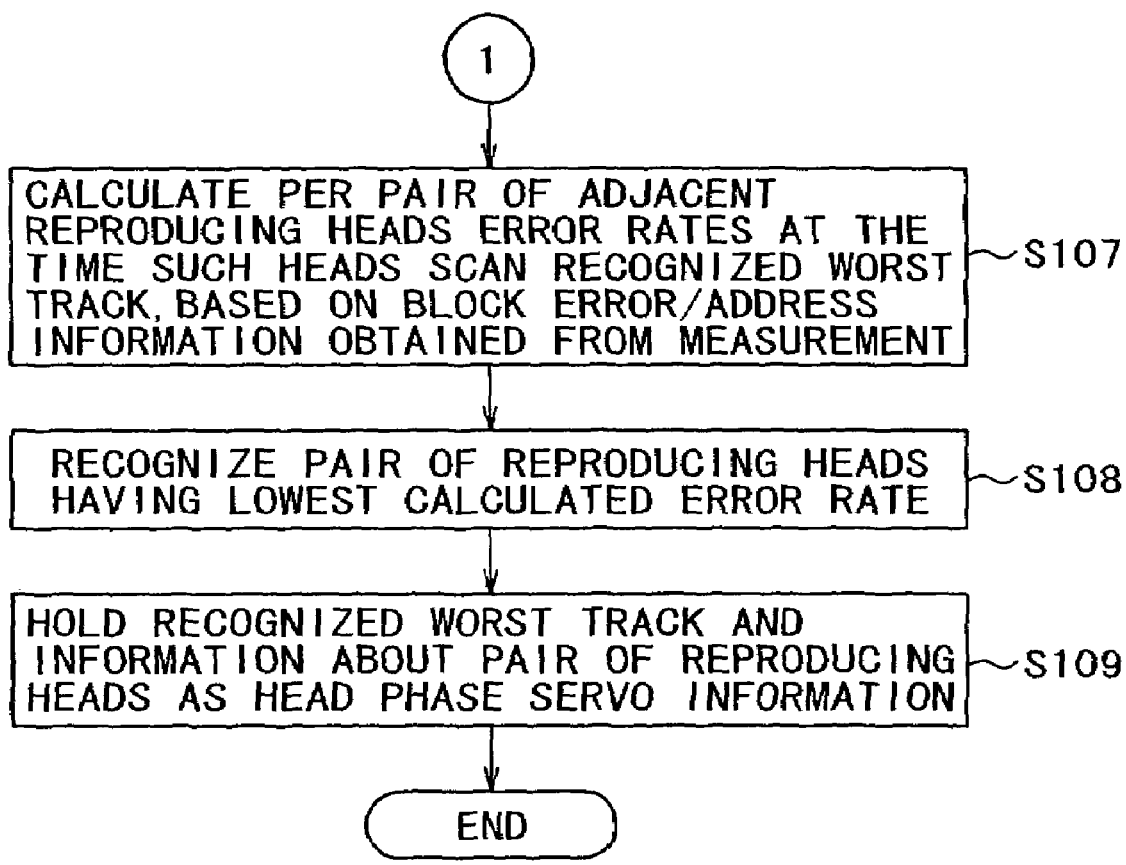
FIG. 7 is a flowchart illustrating an operation of detecting a pair of best heads in a reproducing apparatus according to the embodiment.

Moreover, the method of detecting the worst track and the pair of best heads described with reference to FIGS. 6 and 7 is also merely an example, and the invention is, by no means, limited to this example.

In the above embodiment, a description is given as to the case where eight reproducing heads are disposed on the rotary head drum 2 and two reproducing heads 7 read each of four-track channels formed on the magnetic tape 3a in two rounds of scanning. However, the present invention is suitably applicable likewise to a case where sixteen reproducing heads are disposed on the drum 2 and two reproducing heads 7 read each of eight-track channels formed on the tape 3a in two rounds of scanning. Furthermore, the present invention is suitably applicable further to a case where four reproducing heads are disposed on the drum 2 and two reproducing heads 7 read each of two-track channels formed on the tape 3a in two rounds of scanning.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. An apparatus for reproducing data by scanning four slant tracks formed on a tape recording medium using four reproducing heads disposed on a rotary drum, adjacent ones of said four tracks having different azimuth angles, each of the four reproducing heads is disposed in relation to a respective one of said azimuth angles on said rotary drum, said apparatus comprising:

measuring means for measuring error rates by reading said data from said tracks formed on said tape recording medium by said reproducing heads disposed on said rotary drum;

track detecting means for detecting a worst track deemed to have a highest error rate from said tracks respectively formed at predetermined cycles on said tape recording medium, based on said error rates measured by said measuring means;

head determining means for determining a pair of reproducing heads out of said four reproducing heads, said pair of reproducing heads are able to read data recorded on said worst track at lowest error rates based on said error rates measured by said measuring means; and servo control means for performing tracking servo control such that said worst track is scanned by said pair of reproducing heads determined by said head determining means.

2. An apparatus for reproducing data by scanning slant tracks formed on a tape recording medium using a plurality of reproducing heads disposed on a rotary drum having a first reproduction speed, said apparatus comprising:

measuring means for measuring error rates by reading said data from said tracks formed on said tape recording medium using said reproducing heads disposed on said rotary drum, said measuring means being operatively configured to measure said error rates while said tape recording medium is forwarded at a different speed from the first reproduction speed;

track detecting means for detecting a worst track deemed to have a highest error rate from said tracks respectively formed at predetermined cycles on said tape recording medium, based on said error rates measured by said measuring means;

head determining means for determining a pair of reproducing heads out of said plurality of reproducing heads, said pair of reproducing heads are able to read data recorded on said worst track at lowest error rates based on said error rates measured by said measuring means; and servo control means for performing tracking servo control such that said worst track is scanned by said pair of reproducing heads determined by said head determining means.

3. An apparatus for reproducing data by scanning slant tracks formed on a tape recording medium using a plurality of reproducing heads disposed on a rotary drum having a first reproduction speed, said apparatus comprising:

measuring means for measuring error rates by reading said data from said tracks formed on said tape recording medium by said reproducing heads disposed on said rotary drum;

track detecting means for detecting a worst track deemed to have a highest error rate from said tracks respectively formed at predetermined cycles on said tape recording medium, based on said error rates measured by said measuring means;

head determining means for determining a pair of reproducing heads out of said plurality of reproducing heads, said pair of reproducing heads are able to read data recorded on said worst track at lowest error rates based on said error rates measured by said measuring means; and servo control means for performing tracking servo control such that said worst track is scanned by said pair of reproducing heads determined by said head determining means, wherein said servo control means is operatively configured to position said pair of reproducing heads in the middle of said worst track in a longitudinal direction thereof.

* * * * *